(12) United States Patent
Kikuchi

(10) Patent No.: US 6,318,311 B1
(45) Date of Patent: Nov. 20, 2001

(54) CYLINDER-INJECTION TYPE TWO CYCLE COMBUSTION ENGINE

(75) Inventor: Masakazu Kikuchi, Tokyo (JP)

(73) Assignee: Tohatsu Corporation, Tokyo (JP)

( * ) Notice: Subject to any disclaimer, the term of this patent is extended or adjusted under 35 U.S.C. 154(b) by 0 days.

(21) Appl. No.: 09/573,861

(22) Filed: May 18, 2000

(30) Foreign Application Priority Data

Sep. 10, 1999 (JP) .................................................. 11-256491

(51) Int. Cl.$^7$ ...................................................... F02B 23/10
(52) U.S. Cl. .................................... 123/73 PP; 123/65 P; 123/193.6
(58) Field of Search ................... 123/65 P, 193.6, 123/193.4, 73 PP

(56) References Cited

U.S. PATENT DOCUMENTS

| | | | |
|---|---|---|---|
| 4,056,080 | * 11/1977 | Rutz et al. | 123/193.6 |
| 4,066,050 | * 1/1978 | Ford-Dunn | 123/73 PP |
| 4,162,661 | * 7/1979 | Nakanishi et al. | 123/193.6 |
| 4,831,917 | * 5/1989 | Houben et al. | 123/193.6 |
| 5,067,453 | * 11/1991 | Takashima | 123/193.6 |
| 5,329,902 | 7/1994 | Sakamoto et al. | |
| 5,373,820 | 12/1994 | Sakamoto et al. | |
| 5,469,777 | * 11/1995 | Rao et al. | 123/193.6 |
| 6,142,113 | * 11/2000 | Mochizuka et al. | 123/65 P |
| 6,158,409 | * 12/2000 | Gillespie et al. | 123/193.6 |

* cited by examiner

Primary Examiner—Marguerite McMahon
(74) Attorney, Agent, or Firm—Pearne & Gordon LLP

(57) ABSTRACT

A piston is arranged within a cylinder so as to be movable upwardly and downwardly, a fuel injector is provided at a cylinder head of the cylinder to directly inject fuel into a combustion chamber in the cylinder, and mixture of fuel and air in the combustion chamber is ignited by a spark plug provided at the cylinder head. Scavenging paths and an exhaust port are provided in the cylinder so as to perform scavenging of the combustion chamber and perform exhausting when the piston is moved downwardly by combustion of the mixture. A top portion of the piston is provided with a convex portion with an inclination surface of which inclination extends in a direction of the top portion of the cylinder from an outer periphery of the piston towards a central portion side. The inclination surface of the convex portion is provided as a linear inclination surface of which vertical section contour is linear such that scavenging air from outlet openings of the respective scavenging paths is blown directly on the inclination surface. An angle θ between a ceiling surface at each of the outlet openings of the respective scavenging paths and a perpendicularly crossing surface perpendicularly crossing the axial line of the cylinder is made smaller than an angle α between the linear inclination surface on the top portion of the piston and a perpendicularly crossing surface perpendicularly crossing the axial line of the piston.

3 Claims, 4 Drawing Sheets

CYLINDER-INJECTION TYPE TWO CYCLE COMBUSTION ENGINE

BACKGROUND OF THE INVENTION

1. Field of the Invention

The present invention relates to a cylinder-injection type two cycle combustion engine where fuel is directly injected into a combustion chamber.

2. Description of the Related Art

A conventional cylinder-injection type two cycle combustion engine is provided with a cylinder, a piston reciprocating within the cylinder, a fuel injector for directly injecting fuel into a combustion chamber, a spark plug for igniting mixture of fuel injected into the combustion chamber and air, an exhaust port provided at the cylinder so as to perform exhaust when the piston is moved downward, a plurality of scavenging paths provided along a circumferential direction in a spaced manner for scavenging the combustion chamber when the piston is moved downward, and a crank shaft which is transmitted with upward and downward movements of the piston to be rotated. In this case, the cylinder is formed with a cylinder body formed in a cylindrical shape with its proximal end opened towards a crank chamber, a liner provided in a cylindrical manner so as to cover an inner surface of the cylinder body, and a cylinder head closing a distal end opening of such a cylinder body. The fuel injector and the spark plug are assembled to the cylinder head. The fuel injector is structured so as to directly inject fuel towards a head portion of the piston. A recessed portion is provided at a position on a head portion of the piston against which fuel from the fuel injector directly strikes or in the vicinity thereof, so that the fuel injected from the fuel injector is reflected at the recessed portion towards an inner surface of the cylinder head. The respective scavenging paths are provided along and between the cylinder body and the liner positioned on an inner surface thereof, and their outlet ports are opened to the liner. Inlet ports of the scavenging paths are respectively opened to the crank chamber. Incidentally, there is a case where a liner is not provided on an inner surface of a cylinder body. In such a case, respective scavenging paths are formed in the block of the cylinder body along the axial direction thereof.

In such a conventional cylinder-injection type two cycle combustion engine, the top portion of the piston is formed in a generally horizontal surface or flat surface so as to facilitate injection of scavenging air from the respective scavenging paths into the cylinder at a scavenging time.

In such a conventional cylinder-injection type two cycle combustion engine, however, since the top portion of the piston is made generally flat except for the recessed portion, scavenging air merely flows along the top portion, so that cooling for the piston becomes insufficient at a scavenging time. As a result, there has been a drawback that the temperature of the top portion of the piston becomes high, and in some cases, the piston seizes the liner or the inner surface of the cylinder.

In order to prevent the piston from seizing, there is a method where a clearance between the liner or the inner surface of the cylinder body and the outer peripheral surface of the piston is secured excessively. In such a case, however, there has been a drawback that such a demerit as reduction in engine output or power, increase in piston striking noises or the like is caused.

An object of the present invention is to provide a cylinder-injection type two cycle combustion engine where seizure of a piston can be prevented without excessively forming a clearance between a liner or an inner surface of a cylinder and an outer surface of a piston.

Another object of the invention is to provide a cylinder-injection type two cycle combustion engine where cooling a piston can efficiently be performed at least in the vicinity of an exhaust port in which seizure of a piston is easy to occur.

SUMMARY OF THE INVENTION

The present invention is applied to a cylinder-injection type two cycle combustion engine provided with a cylinder, a piston reciprocating within the cylinder, a fuel injector for directly injecting fuel into a combustion chamber and a spark plug for igniting mixture of fuel injected into the combustion chamber and air, an exhaust port provided at the cylinder so as to perform exhausting when the piston is moved downward, and a plurality of scavenging paths for performing scavenging of the combustion chamber when the piston is moved downward.

In the present invention, a top portion of the piston has a convex portion with an inclination surface of which inclination extends in a direction of the top portion of the cylinder from an outer periphery of the piston towards a central portion side. The inclination surface of the convex portion is formed such that scavenging air from at least a scavenging path near to the exhaust port is blown directly on to the inclination surface.

When the convex portion is provided at the top portion of the piston so that scavenging air is directly blown on the inclination surface positioned about the top of the convex portion, the top portion of the piston is efficiently cooled with scavenging air and the piston is prevented from seizing due to excessive thermal expansion.

In the present invention, it is preferable that the inclination surface of the convex portion on the top portion of the piston is configured in the following manner according to whether the contour of a vertical section thereof is formed in a linear inclination surface or it is formed in a curved inclination surface.

In the case that the inclination surface of the convex portion on the top portion of the piston is formed in the linear inclination surface, an angle θ between a ceiling surface at an outlet port of at least a scavenging path of the scavenging paths which is near to the exhaust port and a perpendicularly crossing surface perpendicularly crossing the axial line of the cylinder is made smaller than an angle α between the linear inclination surface and a perpendicularly crossing surface perpendicularly crossing the axial line of the piston.

When the inclination surface of the convex portion on the top portion of the piston is formed in the curved inclination surface, the angle θ between a ceiling surface at an outlet port of at least a scavenging path of the scavenging paths which is near to the exhaust port and a perpendicularly crossing surface perpendicularly crossing the axial line of the cylinder is made smaller than an angle β between a tangential line extending from the outer periphery of the top portion of the piston toward the center of the top portion regarding the curved inclination surface and a perpendicularly crossing surface perpendicularly crossing the axial line of the piston.

Thus, when the angle θ between a ceiling surface at an outlet port of at least a scavenging path near to the exhaust port and a perpendicularly crossing surface perpendicularly crossing the axial line of the cylinder is set in this manner, scavenging air from at least a scavenging path near to the exhaust port can securely be blown on the inclination surface of the top portion of the piston.

When the recessed portion is provided at the top portion of the piston in the above manner, there occurs a drawback that an amount of scavenging air required for the combustion chamber may not be obtained due to increase in resistance at a scavenging time. Such a drawback can be solved by enlarging a cross-sectional area of an opening of the scavenging path.

In the present invention, the top portion of the piston denotes a distal end or upper end of the piston facing the combustion chamber.

Also, in the cylinder-injection type two cycle combustion engine of the present invention, an upper portion denotes a cylinder head side or a top portion side of the piston, and a lower portion denotes a side opposed thereto. However, even when the cylinder-injection type two cycle combustion engine is arranged in a horizontal or transverse manner, the upper portion and the lower portion are called in the same manner as the above in this invention.

DESCRIPTION OF THE PREFERRED EMBODIMENTS

Embodiments of the present invention will be explained below with reference to the drawings.

Figure 1:
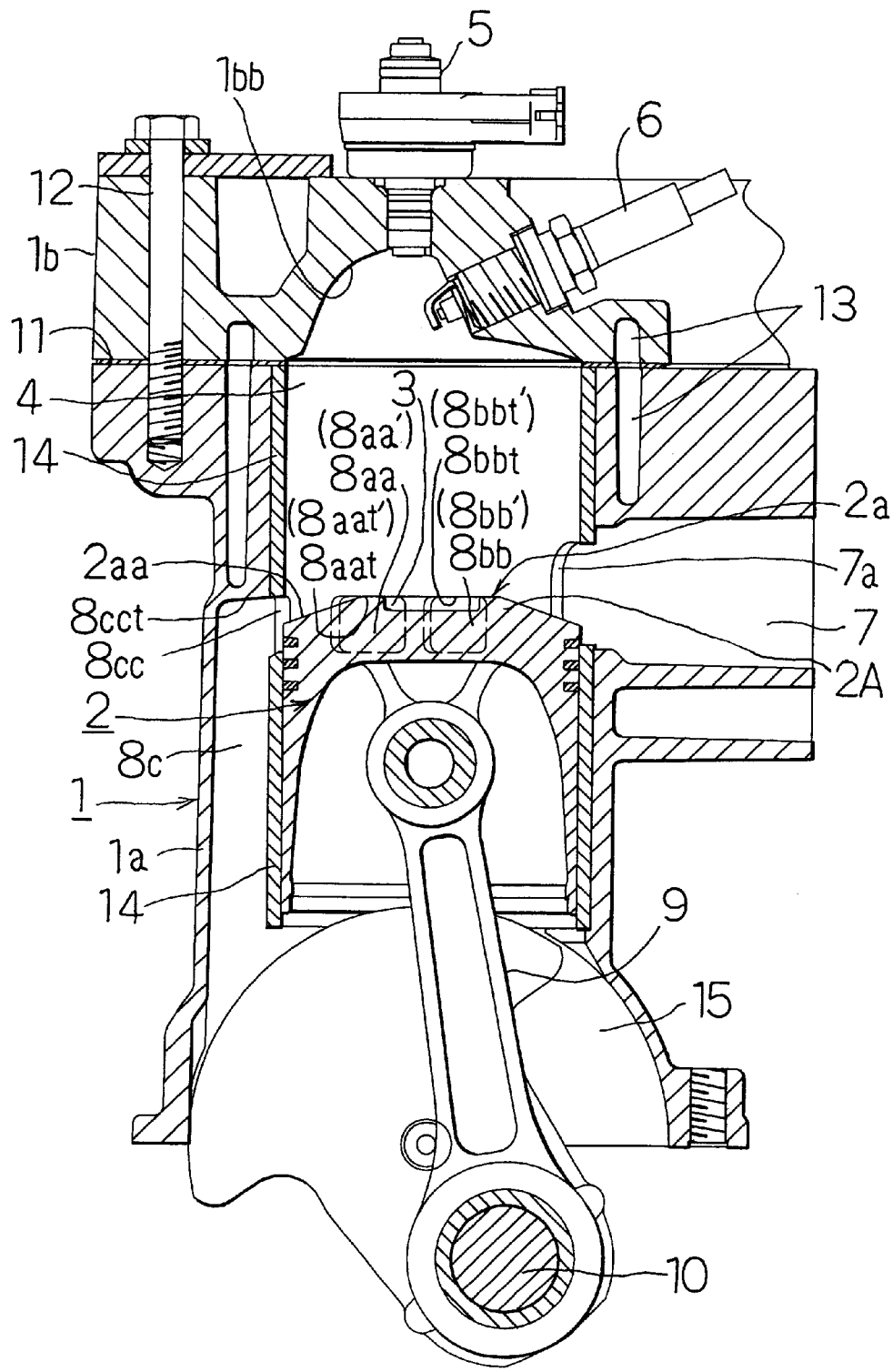
FIG. 1 is a longitudinal sectional view of a first embodiment of a cylinder-injection type two cycle combustion engine according to the present invention.
Figure 2:
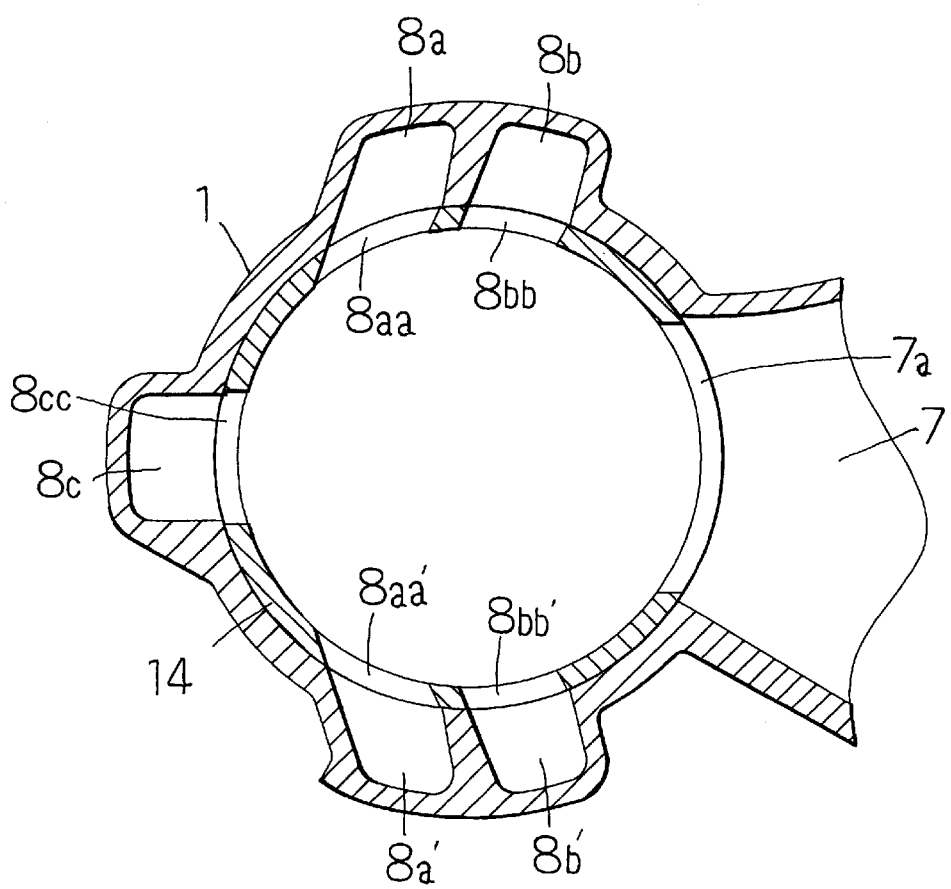
FIG. 2 is a cross-sectional view showing outlet portions of scavenging paths and an inlet portion of an exhaust port of a cylinder of the cylinder injection type two cycle combustion engine of the embodiment.
Figure 3:
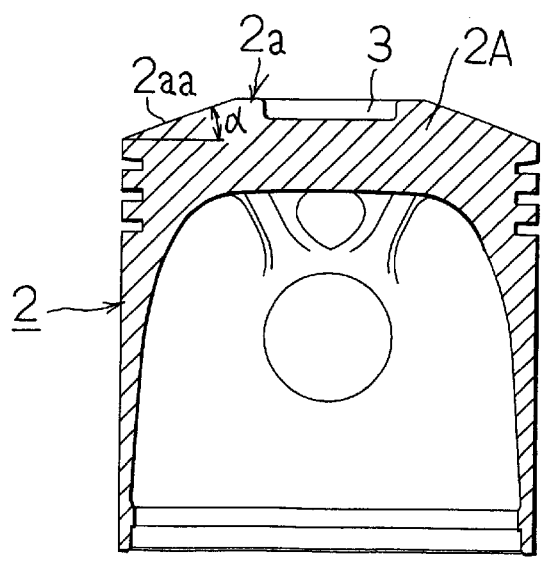
FIG. 3 is a longitudinal sectional view of one example of a piston for the cylinder-injection type two cycle combustion engine used in this embodiment.

As shown in FIGS. 1 and 2, a cylinder-injection type two cycle combustion engine of an embodiment is provided with a cylinder 1, a piston 2 reciprocating within the cylinder 1, a fuel injector 5 for directly injecting fuel into a combustion chamber 4 partitioned by a top portion 2a of the piston 2 within the cylinder 1, a spark plug 6 for igniting mixture of the fuel injected into the combustion chamber 4 and air, an exhaust port 7 provided at the cylinder 1 so as to perform exhausting when the piston 2 is moved downward, a plurality of scavenging paths 8a, 8a', 8b, 8b' and 8c provided along a circumferential direction of the combustion chamber 4 in a spaced manner so as to perform scavenging the combustion chamber 4 when the piston 2 is moved downward, and a crank shaft 10 which is transmitted with upward and downward movements of the piston via a connecting rod 9 to be rotated.

In this case, the cylinder 1 is formed in a cylindrical shape and provided with a cylinder body 1a of which proximal end is opened to a crank chamber 15, a liner 14 formed in a cylindrical shape so as to cover an inner surface of the cylinder body 1a and a cylinder head 1b closing an opening of a distal end of the cylinder body 1a. The cylinder body 1a and the cylinder head 1b of the cylinder 1 are placed or superimposed the latter on the former via a gasket 11 to be coupled to each other by bolts 12. Cooling passages 13 are formed in the cylinder body 1a and the cylinder head 1b so that the cylinder 1 is cooled with cooling water or liquid flowing in the cooling passages 13. The combustion chamber 4 is formed or defined between a top portion 2a of the piston 2 and an inner surface 1bb of the cylinder head 1b opposed thereto. The fuel injector 5 and the spark plug 6 are assembled to the cylinder head 1b such that their distal ends are exposed inside the combustion chamber 4 which is defined by an inner surface 1bb of the cylinder head 1b. The fuel injector 5 injects fuel directly towards the top portion 2a of the piston 2. The top portion 2a of the piston 2 is formed with recessed portions 3 at positions on which fuel injected from the fuel injector 5 directly strike or in the vicinity thereof, so that fuel injected from the fuel injector 5 is reflected at the recess portions 3 towards the inner surface 1bb of the cylinder head 1b. An inlet opening 7a of the exhaust port 7 is opened to the liner 7. The respective scavenging paths 8a, 8a', 8b, 8b', and 8c are provided along and between the cylinder body 1a and the liner 14 positioned on an inner surface thereof, their inlet openings are respectively opened to the crank chamber 15 and their outlet openings 8aa, 8aa', 8bb, 8bb' and 8cc are opened to the liner 14 to communicate with the combustion chamber 4.

In the present invention, particularly, the top portion 2a of the piston 2 has a convex portion 2A with an inclination surface 2aa of which inclination extends in a direction of the top portion of the cylinder 1 from an outer periphery of the piston towards a central portion side thereof. The inclination surface 2aa of the convex portion 2A is formed as a linear inclination surface where a contour of a vertical section is linear such that scavenging air 16 from the outlet openings 8aa, 8aa', 8bb, 8bb' and 8cc of the respective scavenging paths 8a, 8a', 8b, 8b' and 8c shown in FIGS. 1 and 2 is blown directly on to the inclination surface 2aa of the top portion 2a of the piston 2. In this embodiment, a longitudinal sectional configuration of the convex portion 2A of the top portion 2a is formed in a truncated conical shape.

An angle θ between each of ceiling walls 8aat, 8aat', 8bbt, 8bbt' and 8cct at the output openings 8aa, 8aa', 8bb, 8bb' and 8cc of the respective scavenging paths 8a, 8a', 8b, 8b' and 8c, and a perpendicularly crossing surface perpendicularly crossing the axial line of the cylinder 1 is smaller than an angle α between the linear inclination surface 2aa at the top portion 2a of the piston 2 and a perpendicularly crossing surface perpendicularly crossing the axial line of the piston 2.

Figure 4:
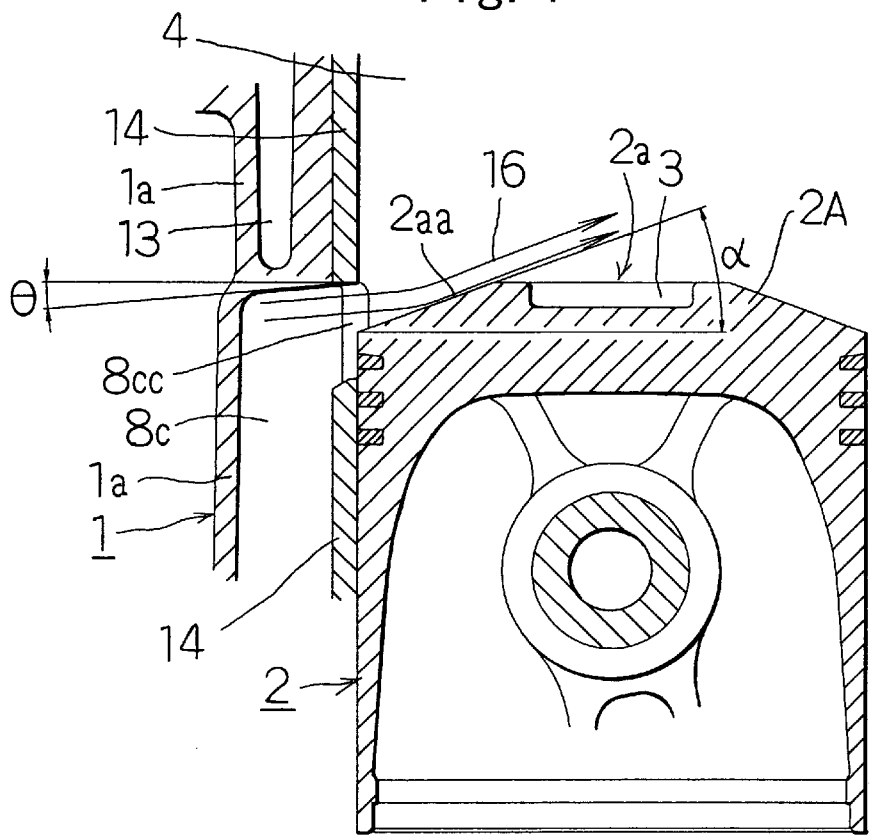
FIG. 4 is a longitudinal sectional view of a main portion of the cylinder-injection type two cycle combustion engine shown in FIG. 1 which is put in a scavenging state.

Thus, when the angle θ between each of ceiling walls 8aat, 8aat', 8bbt, 8bbt' and 8cct at the outlet openings 8aa, 8aa', 8bb, 8bb' and 8cc of the respective scavenging paths 8a, 8a', 8b, 8b'and 8c, and a perpendicularly crossing surface perpendicularly crossing the axial line of the cylinder 1 is set in the above manner, scavenging air 16 from the output openings 8aa, 8aa', 8bb, 8bb' and 8cc of the respective scavenging paths 8a, 8a', 8b, 8b' and 8c can be caused to securely strike on the linear inclination surface 2aa of the top portion 2a of the piston 2, as shown in FIG. 4. Accordingly, the top portion 2a of the piston 2 can efficiently be cooled with the scavenging air so that the piston 2 can be prevented from seizing due to excessive thermal expansion thereof.

In the above manner, when the convex portion 2A is provided on the top portion 2a of the piston 2, an amount of scavenging air required for the combustion chamber 4 may not be secured due to increase in resistance at a time of scavenging. However, such a problem can be solved by enlarging an opening cross-sectional area of each of scavenging paths 8a, 8a', 8b, 8b' and 8c.

Also, as shown in FIG. 2, in the case that three or more scavenging paths 8a, 8a', 8b, 8b' and 8c are provided, only the angle θ between each of ceiling walls 8aat, 8aat', 8bbt and 8bbt' at the outlet openings 8aa, 8aa', 8bb and 8bb' of the scavenging paths 8a, 8a', 8b and 8b', and the perpendicularly crossing surface perpendicularly crossing the axial line of the cylinder 1 is formed to be smaller than the angle α between the linear inclination surface 2aa at the top portion 2a of the piston 2 and the perpendicularly crossing surface perpendicularly crossing the axial line of the piston 2 such that scavenging air 16 from the scavenging paths 8a, 8a', 8b and 8b' near to the exhaust port 7 is blown directly on to the inclination surface 2aa. In this case, since the scavenging path 8c is positioned to be opposed to the exhaust port 7 and heat is not concentrated upon the scavenging path 8c, it is unnecessary to meet θ<α.

Furthermore, when the scavenging paths 8a, 8a', 8b and 8b' are provided on opposing sides or faces two by two, only the angle θ between each of the ceiling walls 8bbt and 8bbt'at the outlet openings 8bb and 8bb' of the scavenging paths 8b and 8b' nearest to the exhaust port 7 may be formed to be smaller than the angle α between the linear inclination surface 2aa at the top portion 2a of the piston 2 and a perpendicularly crossing surface perpendicularly crossing the axial line of the piston 2. Even with such a structure, cooling of the piston 2 in the vicinity of the exhaust port 7 where seizing of the piston 2 is easy to occur can efficiently be performed.

Figure 5:
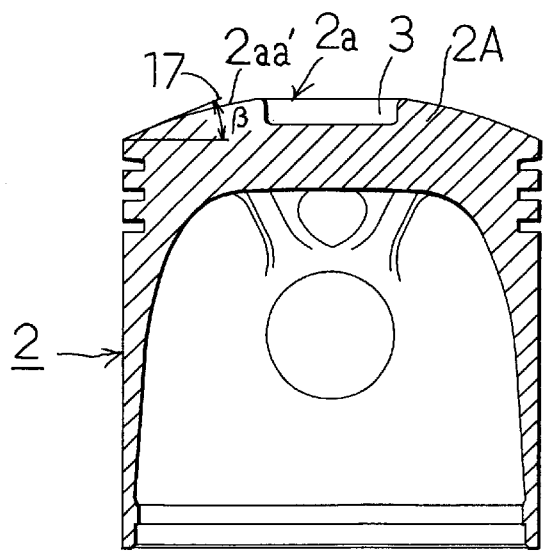
FIG. 5 is a longitudinal sectional view of another example of a piston for the cylinder-injection type two cycle combustion engine used in this embodiment.
Figure 6:
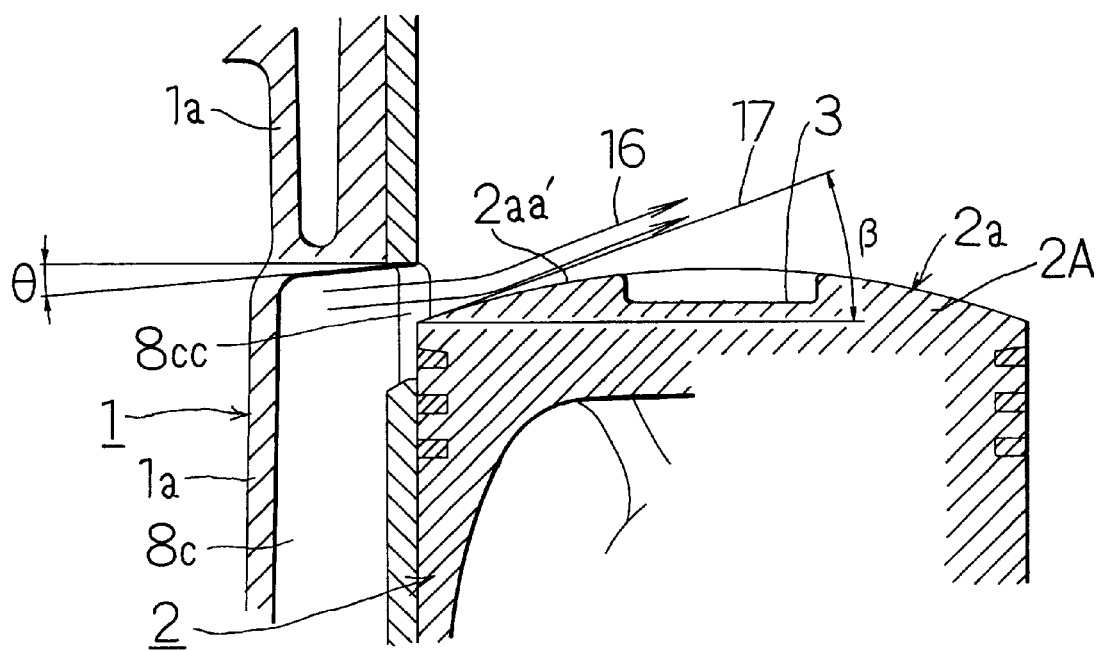
FIG. 6 is a longitudinal sectional view of a second embodiment of a cylinder-injection type two cycle combustion engine according to the present invention which is put in a scavenging state.

FIG. 5 is a longitudinal sectional view showing a second embodiment of a cylinder-injection type two cycle combustion engine according to the present invention, and FIG. 6 is a longitudinal sectional view showing a main structure of the second embodiment of the cylinder-injection type two cycle combustion engine according to the present invention.

The cylinder-injection type two cycle combustion engine of this embodiment is similar to that of the first embodiment regarding the structure that the top portion 2a of the piston 2 for a cylinder-injection type two cycle combustion engine has a convex portion 2A with an inclination surface 2aa' of which inclination extends in a direction of a cylinder 1 from an outer periphery of the piston towards a central portion side. Particularly, in this embodiment, the cylinder-injection type two cycle combustion engine has a feature that the contour or shape of the piston 2, in a longitudinal section, extending from the outer periphery side of the top portion 2a of the piston 2 towards a central portion thereof is formed in a curved inclination surface such that scavenging air 16 from the outlet openings 8aa, 8aa', 8bb, 8bb' and 8cc of the respective scavenging paths 8a, 8a', 8b, 8b' and 8c is blown directly on the inclination surface 2aa'. In this embodiment, the linear inclination surface is formed in an outwardly convex spherical surface.

The angle θ between each of ceiling walls 8aat, 8aat', 8bbt, 8bbt' and 8cct at the output openings 8aa, 8aa', 8bb, 8bb' and 8cc of the respective scavenging paths 8a, 8a', 8b, 8b' and 8c, and a perpendicularly crossing surface perpendicularly crossing the axial line of the cylinder 1 is smaller than an angle β between a tangential line 17 extending an outer periphery of the top portion 2a of the piston 2 towards a central portion thereof regarding the curved inclination surface 2aa' of the top portion 2a of the piston 2 and a perpendicularly crossing surface perpendicularly crossing the axial line of the piston 2.

Thus, even when the angle θ between each of ceiling walls 8aat, 8aat', 8bbt, 8bbt' and 8cct at the output openings 8aa, 8aa', 8bb, 8bb' and 8cc of the respective scavenging paths 8a, 8a', 8b, 8b' and 8c, and a perpendicularly crossing surface perpendicularly crossing the axial line of the cylinder 1 is set in this manner, scavenging air 16 from the output openings 8aa, 8aa', 8bb, 8bb' and 8cc of the respective scavenging paths 8a, 8a', 8b, 8b' and 8c can be caused to securely strike on the linear inclination surface 2aa' of the top portion 2a of the piston 2, as shown in FIG. 6. Accordingly, the top portion 2a of the piston 2 can efficiently be cooled with the scavenging air so that the piston 2 can be prevented from seizing due to excessive thermal expansion thereof.

Incidentally, it is preferable that the relationship of θ<β is met for all of the respective scavenging paths 8a, 8a', 8b, 8b' and 8c, but it is unnecessary for the scavenging path 8c opposed to the exhaust port 7 to meet the relationship of θ<β like the above. Also, when surfaces of the cylinder 1 opposed to each other are provided with the scavenging paths 8a, 8a', 8b and 8b' two by two, only the angle θ between each of ceiling walls 8bbt and 8bbt' at the outlet openings 8bb and 8bb' of the scavenging paths 8b and 8b' nearest to the exhaust port 7 and a perpendicularly crossing surface perpendicularly crossing the axial line of the cylinder 1 may be formed to be smaller than the angle β between the tangential line 17 extending an outer periphery of the top portion 2a of the piston 2 towards a central portion thereof regarding the curved inclination surface 2aa' of the top portion 2a of the piston 2 and a perpendicularly crossing surface perpendicularly crossing the axial line of the piston 2.

In each of the above embodiments, though the case where the inclination surface of the convex portion 2A of the top portion 2a is the linear inclination surface or the curved inclination surface has been described, the present invention is not limited to the embodiment. For example, the inclination surface of the top portion of the piston may be modified or structured such that its rising section is formed in a linear inclination surface and the linear inclination surface is changed to a curved inclination surface in the vicinity of a top of the top portion, the rising section is formed in a curved inclination surface and the curved inclination surface is changed to a linear inclination surface in the vicinity of the top, or the like. In this modification, it is only required that the former type where the rising section is the linear inclination surface meets the relationship of θ<α and the latter type where the rising section is the curved inclination surface meets the relationship of θ<β.

Also, in the above embodiments, the present invention has been applied to the cylinder 1 with the liner 14 on the inner peripheral surface thereof, but the present invention is not limited to these embodiments and it is also applicable to a cylinder having not a liner in the same manner as the embodiments. In this case, the respective scavenging paths 8a, 8a', 8b, 8b' and 8c are provided in the block of the cylinder 1a.

What is claimed is:

1. A cylinder-injection type two-cycle combustion engine comprising a cylinder in said engine, a piston mounted for reciprocation in said cylinder, said piston having a top portion having a recessed portion, a fuel injector for directly injecting fuel into a combustion chamber defined by said piston and cylinder, a spark plug for igniting a mixture of fuel and air in said combustion chamber, an exhaust port provided in said cylinder to exhaust said cylinder upon a downward stroke of said piston, and a plurality of scavenging passages between a crank chamber and scavenging ports in said cylinder to direct air from said crank chamber to said combuBtion chamber, the top portion of the piston further having a raised portion with an inclination surface extending upwardly at an angle $\alpha$ from an outer periphery of the piston, at least a scavenging port near said exhaust port having a ceiling inclined upwardly at an angle of inclination $\theta$, said angle $\theta$ being less than the angle $\alpha$ of said inclination surface, whereby scavenged air at at least said scavenging port near said exhaust port follows a scavenging path so that the scavenged air blows directly onto the inclination surface.

2. A cylinder-injection type two-cycle combustion engine comprising a cylinder in said engine, a piston mounted for reciprocation in said cylinder, said piston having a top portion having a recessed portion, a fuel injector for directly injecting fuel into a combustion chamber defined by said piston and cylinder, a spark plug for igniting a mixture of fuel and air in said combustion chamber, an exhaust port provided in said cylinder to exhaust said cylinder upon a downward stroke of said piston, and a plurality of scavenging passages between a crank chamber and scavenging ports in said cylinder to direct air from said crank chamber to said combustion chamber, the top portion of the piston further having a conical portion sloping upwardly at an angle of inclination a from an outer periphery of the piston, at least a scavenging port near said exhaust port having a ceiling inclined upwardly at an angle of inclination $\theta$, said angle of inclination $\theta$ being less than said angle of inclination $\alpha$, whereby scavenged air at at least said scavenging port near said exhaust port follows a scavenging path so that the scavenged air blows directly onto said conical portion.

3. A cylinder-injection type two-cycle combustion engine comprising a cylinder in said engine, a piston mounted for reciprocation in said cylinder, said piston having a top portion having a recessed portion, a fuel injector for directly injecting fuel into a combustion chamber defined by said piston and cylinder, a spark plug for igniting a mixture of fuel and air in said combustion chamber, an exhaust port provided in said cylinder to exhaust said cylinder upon a downward stroke of said piston, and a plurality of scavenging passages between a crank chamber and scavenging ports in said cylinder to direct air from said crank chamber to said combustion chamber, the top portion of the piston further having a convex portion sloping upwardly at an angle of inclination $\beta$ from an outer periphery of the piston, at least a scavenging port near said exhaust port having a ceiling inclined upwardly at an angle of inclination $\theta$, said angle of inclination $\theta$ being less than said angle of inclination $\beta$, whereby scavenged air at at least said scavenging port near said exhaust port follows a scavenging path so that the scavenged air blows directly onto said convex portion.

* * * * *

UNITED STATES PATENT AND TRADEMARK OFFICE
CERTIFICATE OF CORRECTION

PATENT NO. : 6,318,311 B1
DATED : Masakazu Kikuchi
INVENTOR(S) : November 20, 2001

It is certified that error appears in the above-identified patent and that said Letters Patent is hereby corrected as shown below:

<u>Column 7,</u>
Line 5, "combuβtion" and insert -- combustion --.

Signed and Sealed this

Nineteenth Day of March, 2002

Attest:

Attesting Officer

JAMES E. ROGAN
*Director of the United States Patent and Trademark Office*